UNITED STATES PATENT OFFICE.

KARL BARON von VIETINGHOFF, OF BERLIN, GERMANY.

PROCESS FOR MAKING COFFEE EXTRACT.

1,175,490.          Specification of Letters Patent.      Patented Mar. 14, 1916.

No Drawing.     Application filed January 14, 1915. Serial No. 2,235.

*To all whom it may concern:*

Be it known that I, KARL BARON VON VIETINGHOFF, of 19 Tiergartenstrasse, in the city of Berlin, Germany, manufacturer, have invented certain new and useful Improvements in Processes for Making Coffee Extract, of which the following is a specification.

My invention relates to a new and improved method of preparing a dry extract from coffee berries and its particular object is to provide a method furnishing a better product as regards the taste and flavor of the beverage prepared with it than the methods hitherto known.

Various methods have been devised for preparing dry-extracts from coffee berries. One of them consisted in simply exhausting roasted coffee berries with boiling water and drying by evaporation the liquid extract so obtained. However, the beverage prepared with an extract so prepared does not possess the qualities indispensable for its use in the place of ordinary coffee. This inferiority is caused by the destruction of its aromatic constituents through the action of hot water. For the same reason a regeneration of the aroma escaping with the vapors developed during evaporation has proved an absolute failure. On the other hand, if raw coffee berries are exhausted with water and the watery extract is then dried and roasted, the practical difficulties encountered make the process inoperable. For, in exhausting the raw berries, the hot water dissolves also certain substances which become insoluble by roasting, and when the dried extract is again dissolved in water, a substantial residue will be left. Besides this, the extract prepared from raw berries is apt, owing to its content of albumen, to foam very strongly during evaporation and to acquire a viscosity which does not allow the last traces of water to escape but very slowly, the perfect drying being thereby rendered exceedingly difficult. A uniform roasting of the dry extract prepared after this method cannot be carried through with the usual means.

Still another method consists in heating raw coffee berries in a revolving roaster, with access of air, until the berries begin to acquire a light brown color and have lost about 12 per cent. of their weight, then exhausting the dried berries with water, and roasting the dried extract. However, a mere heating of the raw berries until they begin to acquire a light brown color, does not suffice at all to render the albuminous substances insoluble, and the difficulties encountered during evaporation are little less than those encountered with raw berries.

In carrying my invention into effect I roast raw coffee berries by heating them in a revolving roaster until the berries have acquired a dark brown color. Instead of roasting raw coffee berries myself, I may employ as well roasted coffee berries bought from the trade; however, in order to be sure that the roasting of the berries has been carried out in the right manner, I prefer doing the roasting of the raw berries myself. I then exhaust part or the whole of the roasted coffee berries, which have been powdered previously, with a solvent for fats, such as for instance benzin, benzole, carbon tetra chlorid, or any other suitable substance. From the solution so obtained I evaporate the liquid. The residue is a fatty compound inclosing the greater part of the aromatic substances which impart to coffee its peculiar flavor. The compound so obtained has a bitter but highly aromatic taste and the most perfect coffee flavor. This fatty compound if mixed with dry coffee extract obtained in any well known manner imparts to it the characteristic taste and flavor of freshly prepared high-class coffee. I then exhaust the roasted coffee berries which have been powdered previously with successive portions of boiling water. The liquid extract so obtained is then dried by evaporation, and the dried extract obtained is subjected, in its turn, to a fresh roasting operation. I have ascertained that by roasting the dried extract prepared from roasted coffee berries, contrary to what could be expected, the quality of the dry extract is immensely improved, the dry extract assuming a far stronger natural flavor. However, in the actual practice of my process, in order to obtain the highest output and to fully utilize all the useful constitutents of coffee, I prefer proceeding as follows: The roasted and powdered coffee berries are first exhausted with benzin, benzole, carbon tetra chlorid or any like solvent, and this treatment is then followed by an exhaustion with boiling water, the aromatic fat obtained in the first operation being mixed with the dry extract obtained by exhaustion with water, drying and subsequent roasting. As the aromatic fat obtained by treating a certain quantity of coffee berries will suffice to improve the quality of dry coffee extract obtained from a far greater quantity of coffee berries, only part of the berries need be subjected to a treatment with a view to the preparation of the aromatic fat, and the rest may be simply exhausted with water and the liquid extract dried and roasted. It is quite feasible also to obtain a high-class extract possessing most of the valuable properties of coffee by mixing the aromatic fat or the extract prepared from it with a dry extract prepared from coffee substitutes such as roasted chicory, alone or mixed with real coffee extract.

The roasting of the dried coffee extract according to my invention, prior to its being mixed with the aromatic compounds, is carried out preferably in an open vessel allowing the vapors to escape, the dry extract being heated therein for ten to thirty minutes to about 225 degr. C.

I claim:—

1. In a process for preparing an easily soluble dry extract from coffee berries, exhausting the fully roasted and powdered berries with hot water, evaporating the water and roasting the dried aqueous extract.

2. In a process for preparing an easily soluble dry extract from coffee berries, exhausting the freely roasted and powdered berries first with a solvent for fat and then with water, evaporating the solvent and the water of the extracts, roasting the dried aqueous extract and adding to it the dried fat extract.

In testimony whereof I affix my signature in presence of two witnesses.

KARL BARON von VIETINGHOFF.

Witnesses:
 WOLDEMAR HAUPT,
 HENRY HASPER.